United States Patent [19]

Lobanoff

[11] Patent Number: 4,702,519
[45] Date of Patent: Oct. 27, 1987

[54] VANITY MIRROR

[75] Inventor: Mark Lobanoff, Troy, Mich.

[73] Assignee: Irvin Industries, Inc., Rochester Hills, Mich.

[21] Appl. No.: 885,330

[22] Filed: Jul. 14, 1986

Related U.S. Application Data

[63] Continuation of Ser. No. 746,676, Jun. 20, 1985, abandoned, which is a continuation-in-part of Ser. No. 627,280, Jul. 2, 1984, abandoned.

[51] Int. Cl.⁴ ............................................. A47C 7/62
[52] U.S. Cl. ................................. 297/185; 297/188; 297/191
[58] Field of Search ....................... 297/185, 188, 191; 296/97 H; 248/481, 487

[56] References Cited

U.S. PATENT DOCUMENTS

| | | |
|---|---|---|
| 325,006 | 8/1885 | Neeley .............................. 297/185 |
| 876,039 | 1/1908 | Burrell . |
| 1,026,706 | 5/1912 | Sears ................................. 297/185 |
| 1,555,658 | 9/1925 | Gongaware . |
| 1,573,272 | 2/1926 | Phillips . |
| 1,806,059 | 5/1931 | Hoople . |
| 1,893,458 | 1/1933 | Tatum ............................. 297/191 X |
| 1,958,934 | 5/1934 | Williams . |
| 2,020,585 | 11/1935 | Stansberry . |
| 2,097,419 | 10/1937 | Schmidt . |
| 2,123,319 | 7/1938 | Thompson . |
| 2,134,414 | 10/1938 | Norcross . |
| 2,148,557 | 2/1939 | Hook . |
| 2,231,641 | 2/1941 | Schwab . |
| 2,262,875 | 11/1941 | Almer . |
| 2,268,189 | 12/1941 | Colbert . |
| 2,432,674 | 12/1947 | Office . |
| 2,466,454 | 4/1949 | Logan . |
| 2,486,096 | 10/1949 | Axford et al. . |
| 2,506,689 | 5/1950 | Simpson et al. . |
| 2,547,101 | 4/1951 | Uttz . |
| 2,603,530 | 7/1952 | Jones . |
| 2,640,909 | 6/1953 | Montgomery . |
| 2,673,670 | 3/1954 | Steele . |
| 2,733,763 | 2/1956 | Nygaard . |
| 2,844,200 | 7/1958 | Herr et al. . |
| 2,918,570 | 12/1959 | Diedring . |
| 3,140,781 | 7/1964 | Rothgart . |
| 3,208,792 | 9/1965 | Martin . |
| 3,211,903 | 10/1965 | McElreath . |
| 3,305,679 | 2/1967 | Barcita-Peruchena . |
| 3,375,364 | 3/1968 | Marcus . |
| 3,407,683 | 10/1968 | Liedel ............................. 248/481 X |
| 3,410,602 | 11/1968 | Schuler . |
| 3,542,416 | 11/1970 | Nelson et al. . |
| 3,576,409 | 4/1971 | Fiddler . |
| 3,610,680 | 10/1971 | Brady . |
| 3,622,231 | 11/1971 | Hansen . |
| 3,641,334 | 2/1972 | Kipping . |
| 3,692,992 | 9/1972 | Bain et al. . |
| 3,751,106 | 8/1973 | Mahler et al. . |
| 3,794,828 | 2/1974 | Arpino . |

(List continued on next page.)

FOREIGN PATENT DOCUMENTS

| | | |
|---|---|---|
| 0053663 | 11/1957 | Fed. Rep. of Germany . |
| 1032112 | 6/1958 | Fed. Rep. of Germany . |
| 2027386 | 12/1971 | Fed. Rep. of Germany . |
| 1143365 | 9/1957 | France . |
| 817159 | 7/1959 | United Kingdom . |
| 854938 | 11/1960 | United Kingdom . |
| 999331 | 7/1965 | United Kingdom . |
| 1043087 | 9/1966 | United Kingdom . |
| 1214327 | 12/1970 | United Kingdom . |

*Primary Examiner*—Kenneth J. Dorner
*Assistant Examiner*—Peter R. Brown
*Attorney, Agent, or Firm*—Harness, Dickey & Pierce

[57] ABSTRACT

A vehicle seat assembly is disclosed comprising a vehicle seat; a mirror disposed on the rear side of the seat, a cover for the mirror and a means for mounting the cover to the assembly. A second embodiment is disclosed wherein a light is disposed on the rear side of the seat. Preferably, the light is covered when the cover is in a closed position. A third embodiment is disclosed wherein the mirror is movable.

12 Claims, 12 Drawing Figures

U.S. PATENT DOCUMENTS

| | | | |
|---|---|---|---|
| 3,795,422 | 3/1974 | Robinson et al. | 297/191 |
| 3,853,370 | 12/1974 | Barnhart . | |
| 3,871,703 | 3/1975 | Accatino . | |
| 3,872,295 | 3/1975 | Clancy . | |
| 3,926,470 | 12/1975 | Marcus | 296/97 H X |
| 3,976,275 | 8/1976 | Clark | 248/487 |
| 4,000,404 | 12/1976 | Marcus . | |
| 4,058,340 | 11/1977 | Pinkas . | |
| 4,075,468 | 2/1978 | Marcus . | |
| 4,103,860 | 8/1978 | Haas et al. . | |
| 4,146,762 | 3/1979 | Peck et al. . | |
| 4,174,864 | 11/1979 | Viertel et al. . | |
| 4,202,030 | 5/1980 | Kimura . | |
| 4,323,275 | 4/1982 | Lutz . | |
| 4,363,511 | 12/1982 | Viertel et al. . | |
| 4,363,512 | 12/1982 | Marcus . | |
| 4,421,355 | 12/1983 | Marcus | 296/97 H |
| 4,521,051 | 6/1985 | Cody et al. . | |

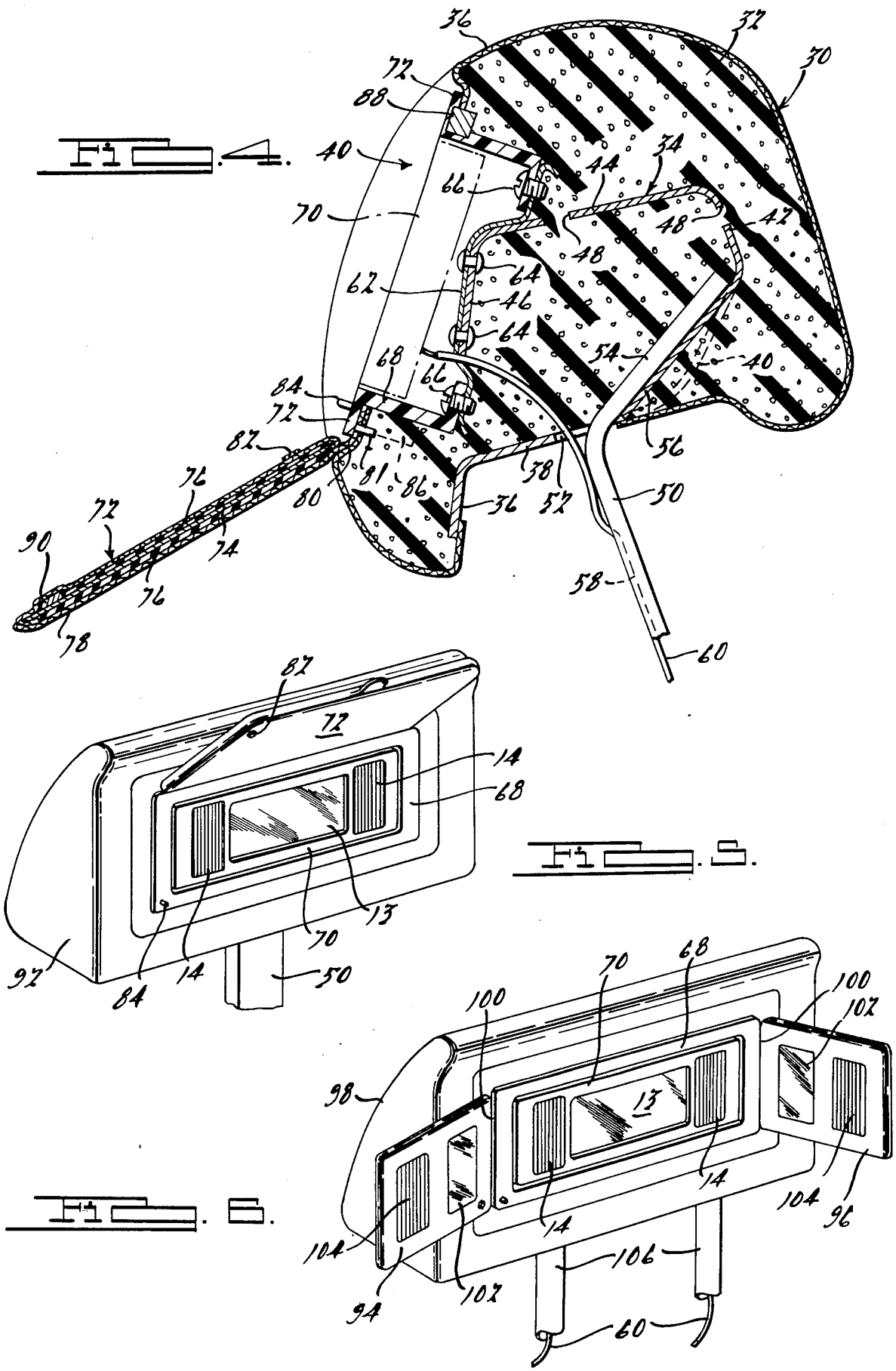

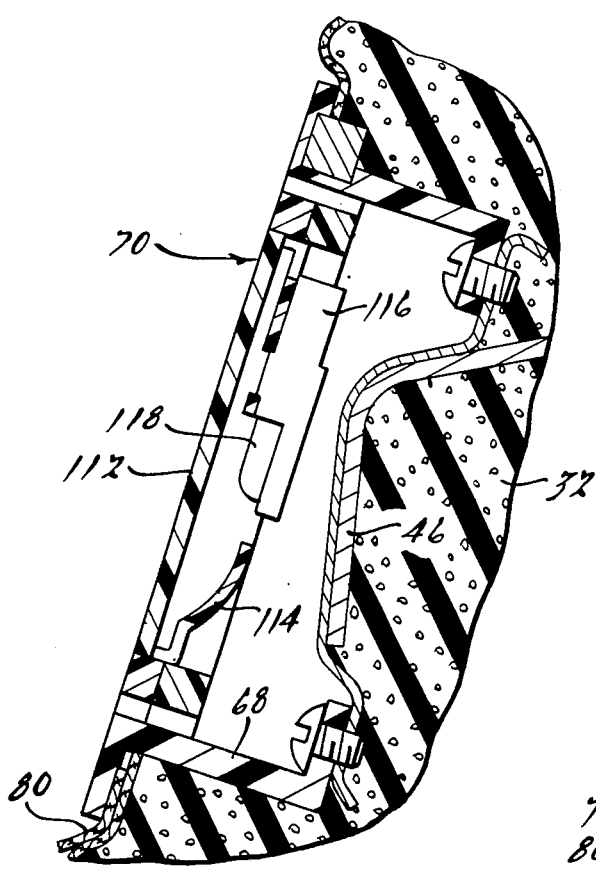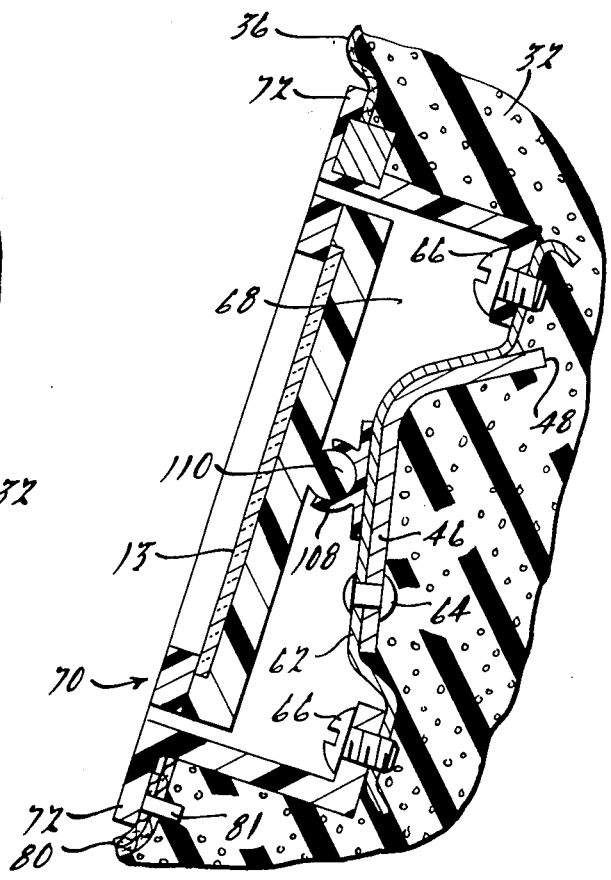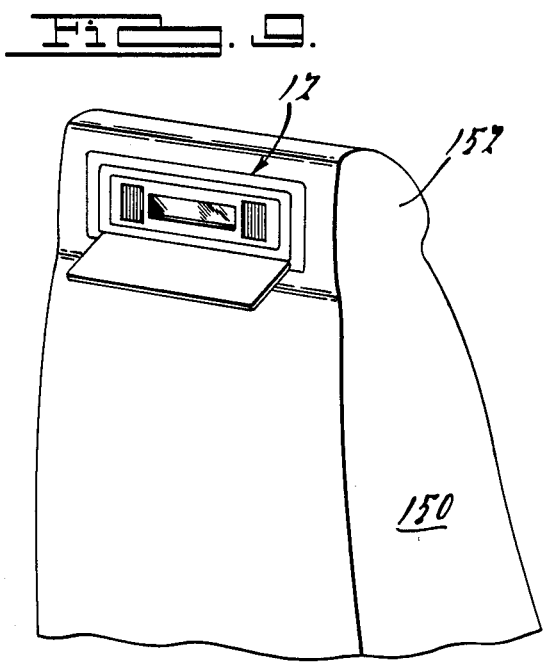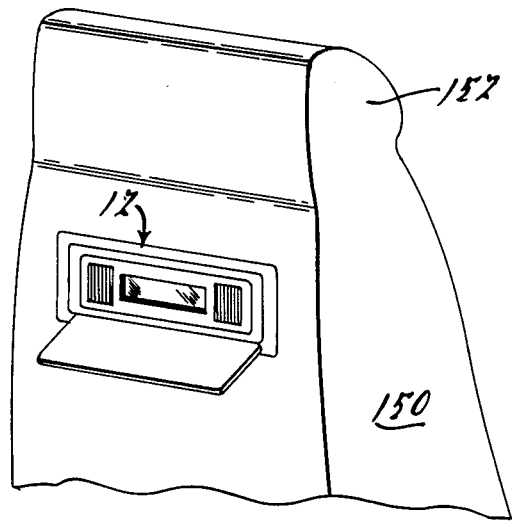

VANITY MIRROR

CROSS REFERENCE TO RELATED APPLICATION

This is a continuation of U.S. patent application Ser. No. 746,676, filed June 20, 1985, abnd, which is a continuation-in-part of application for U.S. patent Ser. No. 627,280, filed July 2, 1984, expressly incorporated herein by reference.

BACKGROUND AND BRIEF DESCRIPTION OF THE INVENTION

Automotive vehicle sunvisors having lighted vanity mirrors for forward seat passengers are known in the art. Such mirrors are normally located on the side of the visor facing the passenger when in lowered position and may be adjusted to the desired reflecting angle through adjustment of the visor, the angle of the mirror relative to the visor being fixed.

In general no similar vanity mirror has been available for the convenience of rear seat passengers; also, in general the only light available for rear seat passengers for reading or the like while the vehicle is underway has been located in the header of the roof, or in some cases in side pillars of the vehicle. Such lights, if shining while the vehicle is underway, can be distracting to the driver and can possibly impair his clear vision of outside traffic conditions, particularly at night.

Accordingly, it is the primary object of the present invention to provide a vanity mirror and map or reading light arrangement which overcomes the aforementioned disadvantages of prior arrangements. The invention resides in the provision of a mirror and light assembly which is mounted on the rear side of one or both of the front vehicle seats, and preferably on the head restraint portion thereof.

Another object of the present invention is to provide a multi-position vanity mirror and map or reading light arrangement for back seat passengers, as well as one which may be covered if desired.

Another object of the present invention resides in the provision of a neat, attractive head restraint for front seats which incorporates a vanity mirror and map or reading light arrangement for back seat passengers.

Front seat head restraints, whether integrated or separate from the seat, have now become safety mandated standard equipment in order to protect passengers against neck injuries resulting from sudden vehicle acceleration caused by rear end collisions. Such head restraints are normally in close alignment with the forward vision of rear seat passengers. This has been discovered to provide an excellent location for a vanity mirror for use by a rear seat passenger, except that most head restraints, unlike sunvisors, have a relatively fixed position so as not to easily accommodate adjustment of mirror angle. However, conventional head restraints do have a substantial depth, relatively greater than the thickness of a sunvisor, and this has been found to be sufficient to accommodate a pivotal mounting for the mirror within the headrest.

Side lights on the mirror combined with a suitable pivoting action have also been found to provide a convenient supplemental reading or map light for the rear passengers which, in fact, may take the place of and obviate the necessity for a conventional overhead header or pillar light, with its attendant disadvantages.

Additional objects and advantages of the present invention will become apparent from a reading of the detailed description of the preferred embodiments, which make reference to the following set of drawings.

BRIEF DESCRIPTION OF THE DRAWINGS

FIG. 4 is a transverse cross-sectional view of a second embodiment of the present invention;

FIGS. 5 and 6 are perspective views of third and fourth embodiments of the present invention;

FIG. 7 is an enlarged fragmentary cross-sectional view similar to FIG. 4, but illustrating a fifth embodiment of the invention;

FIG. 8 is a fragmentary cross-sectional view similar to FIG. 7, but illustrating the details of construction of a light assembly of the present invention; and FIGS. 9-12 are perspective views of four additional embodiments of the present invention.

DESCRIPTION OF THE PREFERRED EMBODIMENTS

Figure 1:
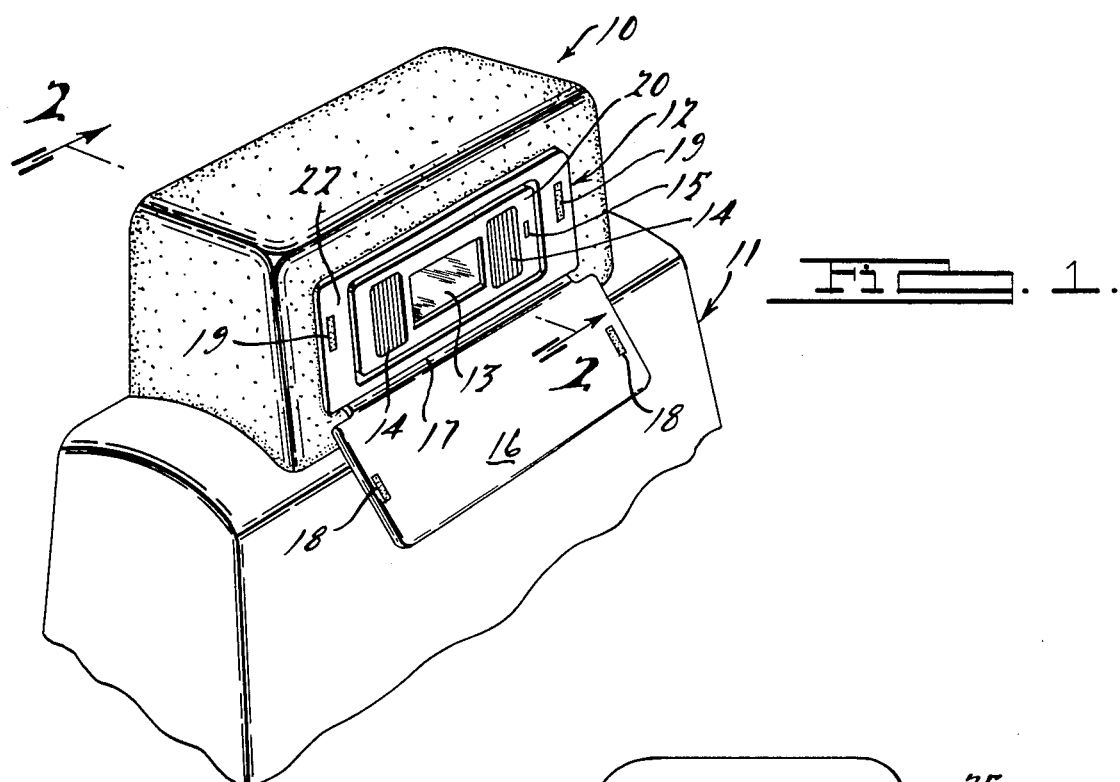
FIG. 1 is a perspective view of the rear side of a head restraint on the top of a vehicle front seat incorporating an embodiment of the vanity mirror assembly of the present invention.
Figure 3:
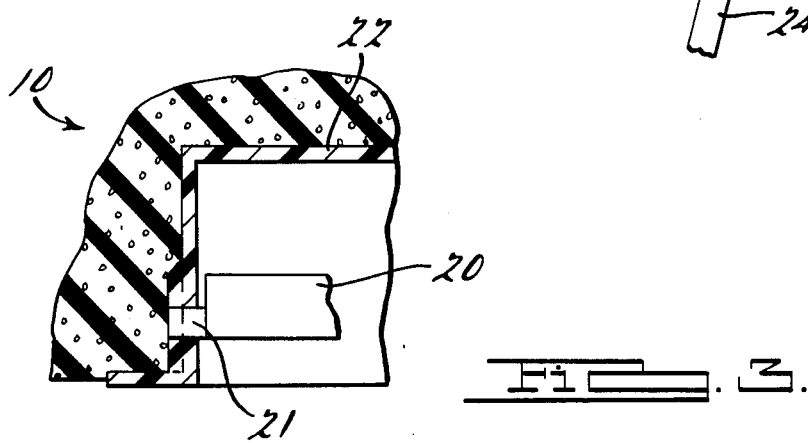
FIG. 3 is a partial sectional view taken generally along line 3—3 in FIG. 2.

With reference to FIG. 1, there is illustrated a head restraint 10 mounted on the top of a vehicle front seat 11 and incorporating a lighted vanity mirror assembly 12 comprising an open plastic receptacle 22 in which is disposed a mirror housing 20 supporting a mirror 13, side lights 14, a light switch 15 and a cover 16 having a fabric hinge 17 and hook-and-loop strips 18. Mating hook-and-loop elements 19 disposed on receptacle 22 retain cover 16 in its closed position. As best shown in FIG. 3, housing 20 is provided with pivotal extensions 21 at each end pivotally disposed in suitable sockets in the ends of receptacle 22, which is embedded within the head restraint. Suitable wiring 23 extends along the headrest mounting arm 24 for lights 14 operated by switch 15, which may be of either the manually actuated slide type, or of the pushbutton type responsive to cover opening and closing control.

Figure 2:
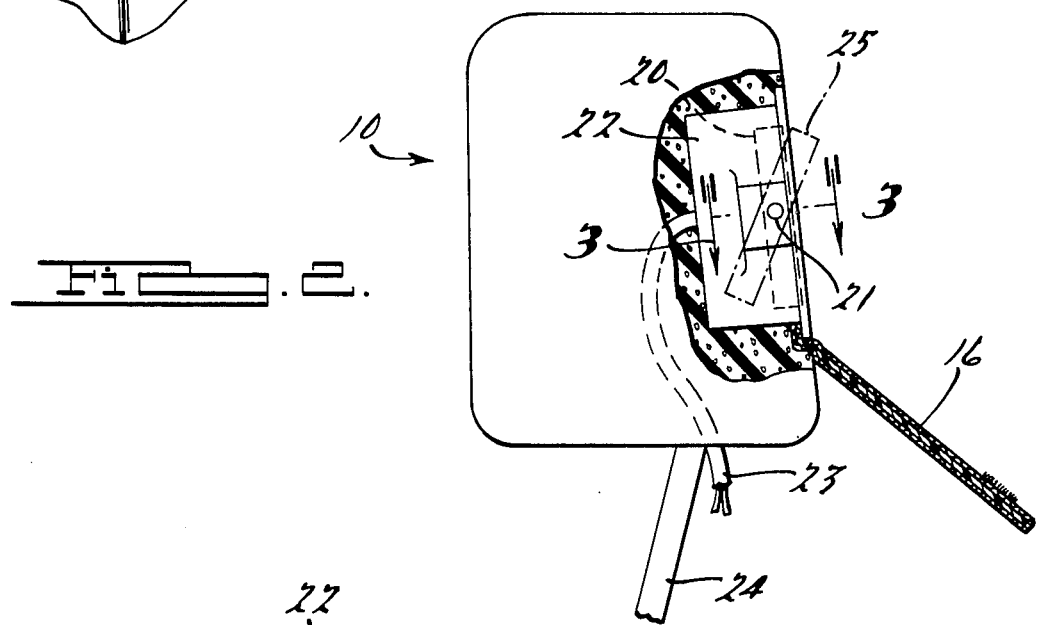
FIG. 2 is a view, partly in transverse section, taken generally along line 2—2 in FIG. 1, but with the head restraint in a raised position with respect to the seat.

It will be understood that tilting of the mirror about a horizontal axis to any desired mirror reflecting, or map reading, angle as illustrated at 25 in FIG. 2, may be accommodated by the pivotal mounting at 21.

Referring to FIG. 4, there is illustrated in transverse cross-section a head restraint 30 comprising a foam core 32, a reinforcing element 34 embedded therein, an outer skin 36 and a mirror assembly 40. The core, reinforcing element and skin are conventional. Reinforcement element 34 is manufactured from sheet metal and possesses the properties and characteristics required by the automotive industry for sustaining shocks of acceleration and deceleration. It is of an overall tubular configuration, as shown in FIG. 4, comprising a flange 36, a bottom wall portion 38, rear wall portions 40 and 42, a top wall portion 44 substantially parallel to bottom wall portion 38 and a front wall portion 46. Reinforcement element 34 has a plurality of apertures 48 therethrough so that it will be permeated with foam and will be of minimum weight for its desired strength.

Head restraint 30 is mounted to the vehicle seat by a centrally located single mounting arm 50 extending through an aperture 52 in bottom wall portion 38. Mounting arm 50 has an angled upper portion 54 affixed to a mounting tab 56 lanced out of wall portion 40. Arm 50, which may be rectangular in cross-section, has one or more grooves 58 in which are disposed power leads 60.

Mirror assembly 40 comprises a mounting plate 62 having a shape complimentary to reinforcement element 34 and is affixed thereto by rivets or the like 64. Plate 62 supports, as by threaded fasteners 66, a rectangular open plastic receptacle 68 in which is pivotally disposed a mirror housing 70 (shown in phantom lines), which is identical to mirror housing 20 in the first embodiment. Receptacle 68 has a peripheral flange 72 which is generally flush with the surface of the head restraint and frames mirror housing 70. Mirror assembly 40 also includes a cover 72 having an overall rectangular shape in plan and comprising a stiff elongated planar member 74 covered by a foam cushion 76 and an outer covering 78. Covering 78 includes an integral hinge portion 80 by which the cover is secured to head restraint 30, as by means of prongs 81 projecting inwardly from the inside face of the lower portion of flange 72. A pad 82 is positioned on cover 72 for contacting plunger 84 of a suitable light switch 86 affixed to the bottom of receptacle 68 and flange 72. Pad 82 may be a hard plastic circular disk and is positioned so that it actuates plunger 84 when the cover is pivoted upwardly to its closed position.

In order to secure cover 72 in its closed position one or more magnets 88 are affixed to the inside face of the top portion of flange 72, and a metallic strip 90 is positioned in cover 72 underneath covering 78. If desired, magnets 88 may be mounted by snapping them into a suitably shaped groove located as shown in FIG. 4. Magnets 88 magnetically attract metallic strip 90 to secure cover 72 in a closed position when it has been manually pivoted to that position.

The embodiment of FIG. 5 is similar to that of FIG. 4, except that cover 72 is pivoted at its top edge, rather than at its lower edge, and the head restraint 92 is of a slightly different overall configuration.

The embodiment of FIG. 6 is similar to that of FIG. 5, except that the cover is divided into two portions 94 and 96 each secured to head restraint 98 by a vertically extending integral hinge 100 disposed on the lateral sides thereof. In this particular embodiment, cover portions 94 and 96 can optionally each be provided with a mirror 102 on its interior surface. The increased number of mirrors increases the visible surface of the viewer. If desired, illumination means 104 may also be positioned on each cover portion 94 and 96. The embodiment of FIG. 6 also incorporates a dual mounting arm configuration having two cylindrical hollow tubular arms 106. In this configuration, power leads 60 may be positioned in the interior of each of hollow tubular arms 106. Mounting arms 106 may be secured to the head restraint reinforcement element in the same manner as in the embodiment of FIG. 4.

In the embodiment of FIG. 7, the mirror housing 70 is mounted by a ball and socket connection to provide for limited universal movement of the mirror and lights with respect to the seat and head restraint. The connection comprises a socket 108 affixed to mounting plate 46 and a complimentary shaped and sized ball member 110 attached to the back of mirror housing 70 and pivotally disposed in socket 108. The parts may be formed of a resilient material, such as plastic, so that they may be assembled by being merely snapped together. This embodiment is otherwise the same as that of FIG. 4.

In FIG. 8 there is shown, in cross-section, a representative light assembly, usually two of which are used in each mirror assembly. At the location of a light assembly, mirror housing 70 comprises a removable Fresnel lens 112, a support bracket and reflector 114 affixed to housing 70 and overlying the inside face of lens 112, and affixed to bracket 114 a bulb socket and reflector member 116 in which a conventional bulb 118 is removably disposed. Power is supplied using conventional wiring from the vehicle battery. Alternatively, a separate battery can be located in each seat or head restraint provided with a vanity mirror of the present invention. The switch circuit is conventional.

The present vanity mirror assembly 12 may also be positioned in the back of a vehicle seat 150 having an integral head restraint 152, as shown in FIGS. 9 and 10. In FIG. 9 integral head restraint 152 is modified to accommodate the vanity mirror assembly 12 described herein. Alternatively, vanity mirror assembly 12 of the present invention may be positioned elsewhere in the back of vehicle seat 150, as shown in FIG. 10. Since the present invention provides for pivoting movement of the mirror and lights, the vanity mirror assembly can be positioned in a multiplicity of positions on a vehicle seat back and still function satisfactorily.

Figure 11:
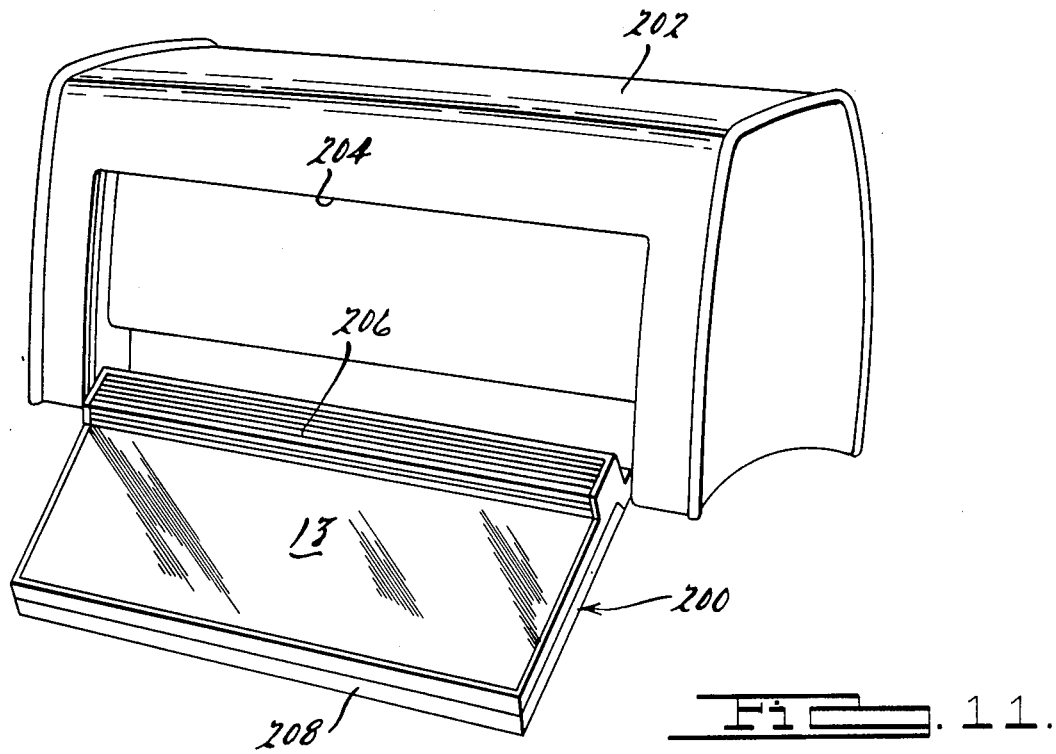

FIG. 11 illustrates another embodiment of the present invention in which a mirror assembly 200 is pivotably mounted to a head restraint 202 having a recess 204 on its posterior side for storage of mirror assembly 200 in its closed position. Mirror assembly 200 comprises a light assembly 206, a mirror 13 and a base plate 208. The mirror and light assembly can be of any desired construction. The base plate 208 is generally rectangular in plan and is hinged along its top edge (when open) to head restraint 202, in any suitable manner. Light assembly 206 preferably projects from the plane of base plate 206, and has a rectangular lens positioned adjacent the top edge of mirror 13 when assembly 200 is open. The light assembly and mirror retract into the recess 204 of head restraint 202 when the assembly is in its closed position. Any type of closing and latching means may be used to maintain the assembly in its closed position, including magnetic means, hook and loop fastener means, latch and catch means, and the like. Mirror assembly 200 is shown in an intermediate position in FIG. 11. When open, the mirror assembly hangs downwardly where it can be manually tilted to any desired position.

Figure 12:
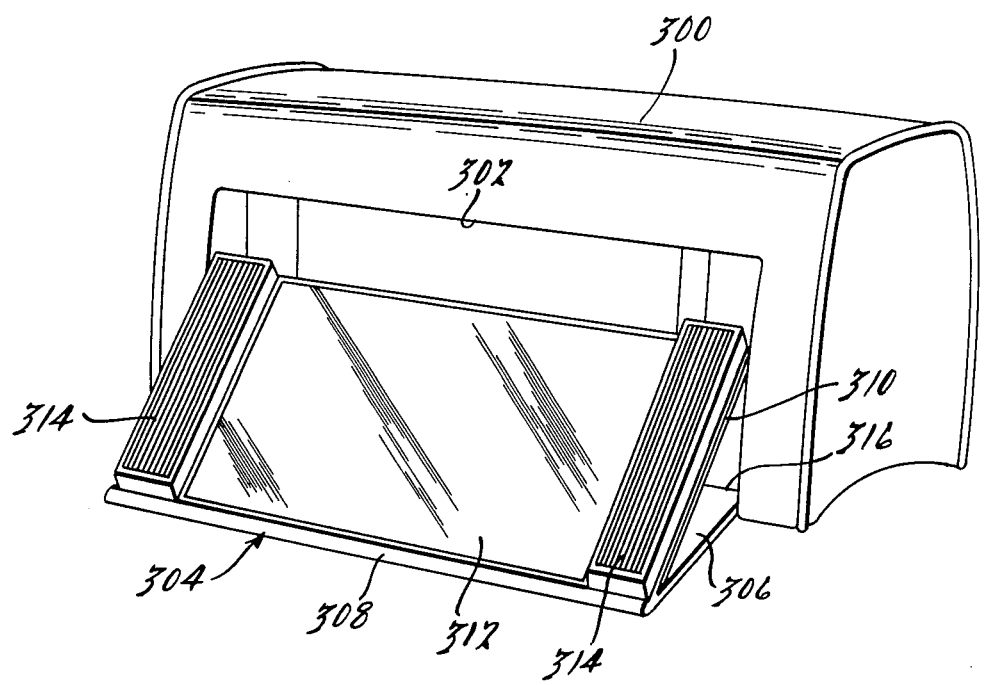

FIG. 12 illustrates another embodiment of the present invention in which a head restraint 300 has a recess 302 on its posterior side adapted to accept a vanity mirror and light assembly 304. Assembly 304 comprises a base plate 306 hinged at 308 to a mirror support 310 on which is mounted a mirror 312 and a pair of light assemblies 314 of any desired type. Assembly 304 is pivotally connected to restraint 300 by a pivotal hinge located at 316.

Mirror 312 (and lights 314) can be manually set at any inclination by merely swinging the assembly about pivot 316, with the top edge of the assembly resting against the bottom surface of recess 302. If desired, suitable notches may be provided on either mirror support 310 or one of the surfaces of recess 302, with corresponding projections on the other part, in order to provide fixed mirror positions. To close the assembly, mirror support 310 is swung downwardly against base plate 306, and the entire assembly swung upwardly into closed position, where it can be maintained by any suitable latch or gripping arrangement.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A seat assembly, comprising in combination:
    (a) a vehicle seat including a head restraint having front and rear sides, said head restraint further including energy-absorbing means for sustaining loads imposed thereon;
    (b) head restraint mounting means for interconnecting said head restraint with said seat;
    (c) a light disposed on the rear side of said head restraint;
    (d) a mirror pivotally disposed on the rear side of said head restraint, said light and said mirror being interconnected with one another as a mirror-and-light assembly, said mirror-and-light assembly being pivotally interconnected with said rear side of said head restraint for pivotal movement relative thereto about a first axis, said mirror-and-light assembly being pivotally movable to a plurality of pivoted positions relative to said head restraint, and said mirror-and-light assembly being positioned on said head restraint with said energy-absorbing means between said front side of said head restraint and said mirror-and-light assembly;
    (e) a cover for said mirror-and-light assembly; and
    (f) means interconnecting said cover with said head restraint for pivotal movement of said cover relative to said head restraint about a second axis between a first closed position substantially covering said mirror-and-light assembly and a second open position wherein said mirror-and-light assembly are substantially exposed.

2. A seat assembly as claimed in claim 1, wherein said head restraint is fixed relative to said seat.

3. A seat assembly as claimed in claim 1, wherein said head restraint is movable with respect to said seat.

4. A seat assembly as claimed in claim 1, wherein said first axis is generally horizontal.

5. A seat assembly as claimed in claim 4, wherein said second axis is generally adjacent the top edge of said mirror.

6. A seat assembly as claimed in claim 4, wherein said second axis is generally adjacent the bottom edge of said mirror.

7. A seat assembly as claimed in claim 4, wherein said first axis is generally adjacent the center of said mirror.

8. A seat assembly as claimed in claim 1, wherein said second axis is generally vertical.

9. A seat assembly as claimed in claim 8, wherein said cover comprises two portions each pivotally supported along one vertical edge.

10. A seat assembly as claimed in claim 1, further comprising in combination a universal connection for interconnecting said mirror-and-light assembly with the rear side of said head restraint and for providing universal pivotal movement of said mirror-and-light assembly with respect to said head restraint.

11. A seat assembly as claimed in claim 1, wherein the vehicle includes a power source, said seat assembly further comprising in combination power lead means for operably interconnecting said light with said power source, at least a portion of said power lead means extending generally along said head restraint mounting means, said head restraint mounting means including means for at least partially housing said power lead means.

12. A seat assembly as claimed in claim 11, wherein said head restraint mounting means includes a recessed portion for receiving said power lead means.

* * * * *